Feb. 2, 1932. G. R. BAKER ET AL 1,843,859
RECONDITIONING CHOCOLATE FOR COATING CONFECTIONERY AND THE LIKE
Original Filed March 31, 1926
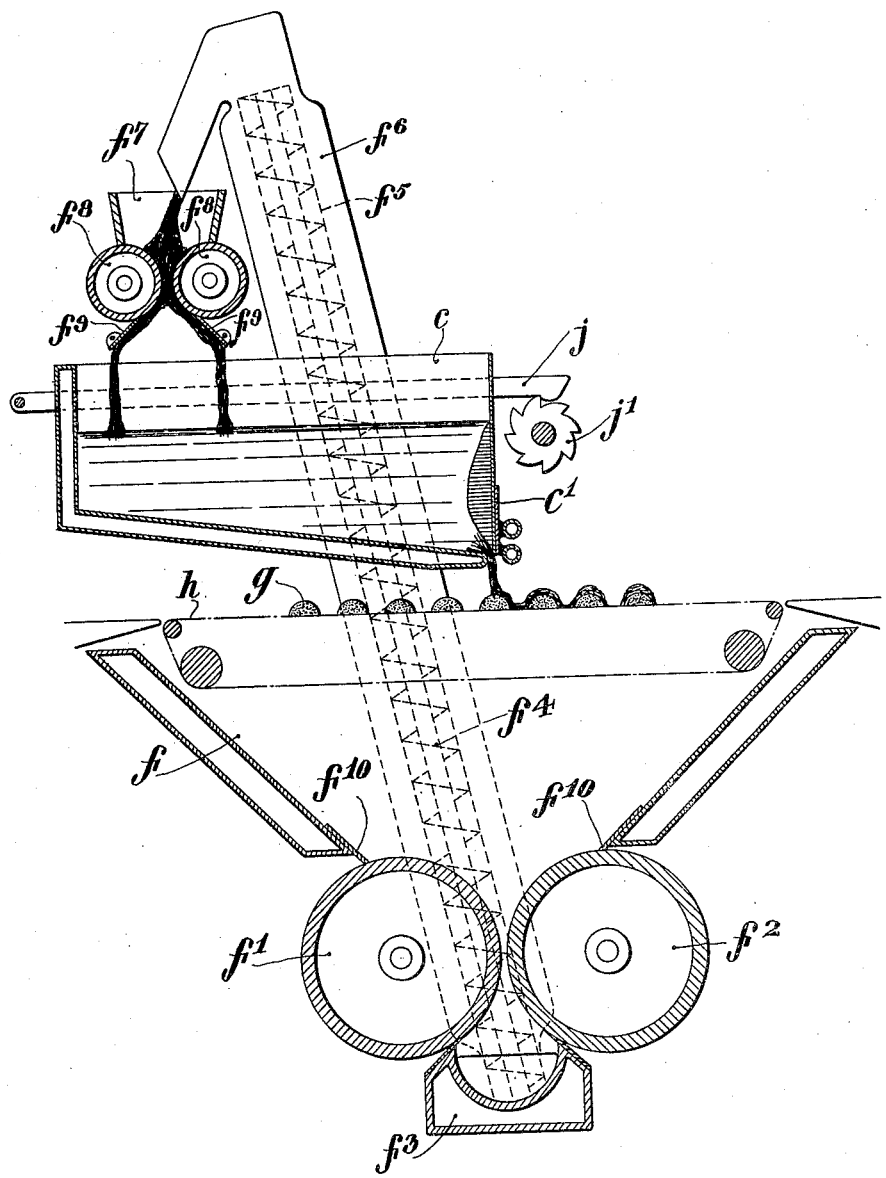
Inventors.
George Ralph Baker.
James Washington Epps.
George William Perks.
Attorney.

Patented Feb. 2, 1932

1,843,859

UNITED STATES PATENT OFFICE

GEORGE RALPH BAKER, OF LONDON, JAMES WASHINGTON EPPS, OF WARLINGHAM, AND GEORGE WILLIAM PERKS, OF SOUTHPORT, ENGLAND, ASSIGNORS TO BAKER PERKINS CO. INC., OF SAGINAW, MICHIGAN, A CORPORATION OF NEW YORK

RECONDITIONING CHOCOLATE FOR COATING CONFECTIONERY AND THE LIKE

Original application filed March 31, 1926, Serial No. 179,662, Patent No. 1,737,447, Divided and this application filed July 9, 1928, Serial No. 291,163, and in Great Britain March 31, 1926.

This invention relates to the coating of confections with chocolate by the process in which the confections are caused to pass through a curtain of molten chocolate, the surplus not retained by the confections falling into a receiver whence it is returned to the feeding vessel supplying the curtain.

In such processes, as heretofore practised, the surplus chocolate is raised by an elevator, usually a pump, to the feed vessel, and if found not liquid enough for immediate re-use the attendant either adds a further amount of hot liquid chocolate and mixes it with the elevated mass or he manipulates the heating means to heat up the whole body of chocolate to the degree that he judges sufficient for its use. These rough and inexact methods depend for success on the skill and knowledge of the attendant and moreover are not adapted for use if the chocolate has to be supplied in a state requiring observance of exact limitations of temperature, as for example in the process set forth in our prior Patent No. 1,737,447, granted Nov. 26, 1929, of which the present case is a division, where the temperature of the mass must be such that incipient crystallization of the chocolate can be initiated in and also confined to that superficial portion of the chocolate curtain which is to form the outside of the coating on the confections.

According to the present invention the aforesaid surplus chocolate, during its return, is first heated up to at least a temperature at which any fat crystals that exist in it are entirely remelted, and it is then cooled to the desirable temperature for coating, which usually will be a temperature only slightly above that at which the crystals tend to reform. Thus, on its arrival in the feed vessel it still contains no crystals but is in such temperature condition that crystals may commence to form where the chocolate is subjected to cooling conditions, as for example local cooling conditions, if the chocolate is to form the exterior portion of the curtain as described in the aforesaid patent.

Apparatus suitable for this purpose is shown by way of example in the annexed drawing.

$c$ is the feed or flooding trough or vessel and $h$ the conveyor for the confections or "centres" $g$ which pass through the curtain of chocolate descending from the outlet of vessel $c$.

The molten chocolate not picked up by the "centres" $g$ falls through the conveyor $h$ into a heated tray or other container and is finally elevated, as by pumping, to be again fed to the flooding trough. But before it reaches the latter it is subjected to means whereby the whole of the chocolate is reconditioned, by being heated to a temperature slightly above melting point, so that it is entirely free from crystals, as for example 34.5° C., and then tempered down to the temperature required for coating the goods according to the nature of the coating required. The chocolate falling through the conveyor may contain solid or semi-solid lumps such as would fall from roller scrapers or other unheated parts of the mechanism, and all such lumps must be melted.

This may be effected in various ways but an appropriate method is illustrated in the drawing in which the chocolate is collected below the conveyor $h$ in a heated trough $f$ and passes from the latter between a pair of heated, closely-set revolving rollers $f^1$, $f^2$ which may, if desired, be rotated at different speeds. Scrapers $f^{10}$ for the rollers are shown as attached to the wall of the trough $f$. The said rollers will press out the lumps and ensure that the whole mass of the chocolate will be well mingled together when passing between them in fully molten condition. Other ways of attaining the same object are to pass the lumpy chocolate into a heated collecting trough, or to feed or pump it through a strainer which will retain the lumps until the hot chocolate flowing past causes them to melt.

The chocolate from between the rollers $f^1$, $f^2$ passes into a jacketed trough $f^3$ from which it may be elevated by any convenient pumping mechanism, preferably jacketed, to prevent chilling, a preferred or suitable elevating means comprising a revolving worm or screw elevator $f^4$ shown as having an inclined axis and working within a pipe or tube $f^5$ in which the worm fits. The said pipe or tube is suitably jacketed as at $f^6$ to receive a heating or tempering medium to either bring the chocolate to or maintain it at the desired temperature to prevent chilling and graining thereof. The action of the worm within the tube stirs the chocolate and tends to maintain it at a uniform temperature throughout. The chocolate delivered from the elevator $f^4$ may be fed direct to the flooding trough or be delivered into a jacketed tank or hopper $f_7$ in which it may be stirred and maintained at or brought to the temperature required for coating.

It will be necessary to cool down the chocolate to bring it to the correct temperature for applying to the goods, either by passing a tempering medium through the elevating worm jacket $f^6$ or through one of the other tempering jackets in the machine. If too much cooling is effected the effect of the cooled jacket may be to produce a considerable amount of graining or crystallizing throughout the mass of chocolate. In order to remelt such grained chocolate and to ensure that there is substantially no graining in the chocolate fed to the flooding vessel $c$, it may be desirable to again pass the chocolate through one or more pairs of heated revolving rollers $f^8$ or their equivalent in hopper $f^7$ and from which it passes direct to the flooding vessel, two scrapers being shown at $f^9$ co-operating with said rollers to conduct the chocolate in two streams.

In both methods last described it is also desirable to rapidly tap or vibrate the container or distributing vessel $c$, or its equivalent, as the case may be, and such vibration which may suitably be effected as by mounting the container on a pivoted bar or bars $j$ the free end of which is hooked to engage a rotatable ratchet or toothed wheel $j^1$, or by other suitable means. This vibration causes the chocolate to flow more readily, and it also removes imprisoned air from the chocolate and so improves the quality of the resultant goods.

What we claim as our invention and desire to secure by Letters Patent of the United States is:—

1. In the process of coating confectionery and the like with chocolate, the method wherein the surplus coating substance not retained by the confections is reconditioned and again used for further coating operations by being first heated to a temperature of about 34.5° C., so as to dissolve any crystals which may have formed, and then cooled to a temperature above that at which graining occurs.

2. In the process of coating confectionery and the like with chocolate, the method wherein the surplus coating substance not retained by the confections is reconditioned and again used for further coating operations by being first heated to a temperature of about 34.5° C., so as to dissolve any crystals which may have formed, and then cooled to a temperature above that at which graining occurs.

3. In the process of coating confectionery and the like with chocolate, the method wherein the surplus coating substance not retained by the confections is reconditioned and again used for further coating operations by being first heated to a temperature of about 34.5° C., so as to dissolve any crystals which may have formed, then cooled to a temperature above that at which graining occurs, and then further cooled to grain the chocolate.

4. The method according to claim 1 in in which the surplus coating substance is freed from lumps and heated and is then cooled to the coating temperature on its way to a flooding vessel but without graining.

5. The method according to claim 1 in which the surplus coating substance is freed from lumps and heated, is then cooled on its way to a flooding vessel, and is again reheated to ensure that it is in ungrained condition throughout before reaching said flooding vessel.

6. In the method of coating confectionery and the like, which comprises depositing on the confections a coating substance one portion of which, forming the outside of the coating, is in a "grained" or partly crystallized condition, the step of reconditioning for further coating operations, the surplus coating substance not retained by the confections by first heating said surplus substance to above the temperature at which crystals are dissolved, and then cooling it to the temperature at which said crystals are about to form.

In witness whereof we have signed this specification.

GEORGE RALPH BAKER.
JAMES WASHINGTON EPPS.
GEORGE WILLIAM PERKS.